United States Patent
Ovaere et al.

(10) Patent No.: US 11,534,962 B2
(45) Date of Patent: Dec. 27, 2022

(54) METHOD AND APPARATUS FOR OPTIMISATION OF THE SUPPORTS FOR THE ADDITIVE MANUFACTURING OF A COMPONENT WITH A RECESS

(71) Applicant: SAFRAN AIRCRAFT ENGINES, Paris (FR)

(72) Inventors: Nicolas Ovaere, Moissy-Cramayel (FR); Jacques Marcel Arthur Bunel, Moissy-Cramayel (FR); Thomas Gricourt, Moissy-Cramayel (FR); Paul André Somazzi, Moissy-Cramayel (FR); Sylvain Zambelli, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 179 days.

(21) Appl. No.: 17/040,235

(22) PCT Filed: Mar. 19, 2019

(86) PCT No.: PCT/FR2019/050611
§ 371 (c)(1),
(2) Date: Sep. 22, 2020

(87) PCT Pub. No.: WO2019/180363
PCT Pub. Date: Sep. 26, 2019

(65) Prior Publication Data
US 2021/0016498 A1 Jan. 21, 2021

(30) Foreign Application Priority Data
Mar. 23, 2018 (FR) ...................................... 1852558

(51) Int. Cl.
*B22F 5/00* (2006.01)
*B33Y 10/00* (2015.01)
(Continued)

(52) U.S. Cl.
CPC ............ *B29C 64/153* (2017.08); *B22F 5/009* (2013.01); *B22F 10/47* (2021.01); *B29C 64/245* (2017.08);
(Continued)

(58) Field of Classification Search
CPC ..... B29C 64/153; B29C 64/245; B29C 64/40; B29C 64/227; B22F 5/009; B22F 10/47;
(Continued)

(56) References Cited

U.S. PATENT DOCUMENTS

2017/0066083 A1 3/2017 Shioya et al.
2018/0200962 A1* 7/2018 Redding ................. B22F 10/40

FOREIGN PATENT DOCUMENTS

| EP | 2719870 B1 | 12/2016 |
| FR | 3013380 A1 | 5/2015 |
| GB | 2541811 A | 3/2017 |

OTHER PUBLICATIONS

Search Report issued in French Patent Application No. 1852558 dated Nov. 7, 2018.
(Continued)

*Primary Examiner* — Rick K Chang
(74) *Attorney, Agent, or Firm* — Pearne & Gordon LLP

(57) ABSTRACT

A method for obtaining, by additive manufacture, a component including at least one recess, this method including: a step of forming, by additive manufacture, a one-piece blank component, in which the at least one recess contains a support including a core in the form of a block of material and cellular elements that connect the core to the recess; and a step of detaching the support from the rest of the blank component in order to expose the recess.

10 Claims, 5 Drawing Sheets

(51) Int. Cl.
*B29C 64/153* (2017.01)
*B29C 64/245* (2017.01)
*B29C 64/40* (2017.01)
*F01D 25/16* (2006.01)
*B22F 10/47* (2021.01)
*B33Y 80/00* (2015.01)
*B29L 31/04* (2006.01)

(52) U.S. Cl.
CPC ............ *B29C 64/40* (2017.08); *F01D 25/162* (2013.01); *B29L 2031/04* (2013.01); *B33Y 10/00* (2014.12); *B33Y 80/00* (2014.12); *F05D 2230/31* (2013.01)

(58) Field of Classification Search
CPC ...... B22F 2003/247; B22F 3/24; B22F 10/28; F01D 25/162; B29L 2031/04; B33Y 10/00; B33Y 80/00; B33Y 30/00; F05D 2230/31; Y02P 10/25
See application file for complete search history.

(56) References Cited

OTHER PUBLICATIONS

International Search Report for issued in Application No. PCT/FR2019/050611 dated May 17, 2019.
Written Opinion for PCT/FR2019/050611 dated May 17, 2019.

* cited by examiner

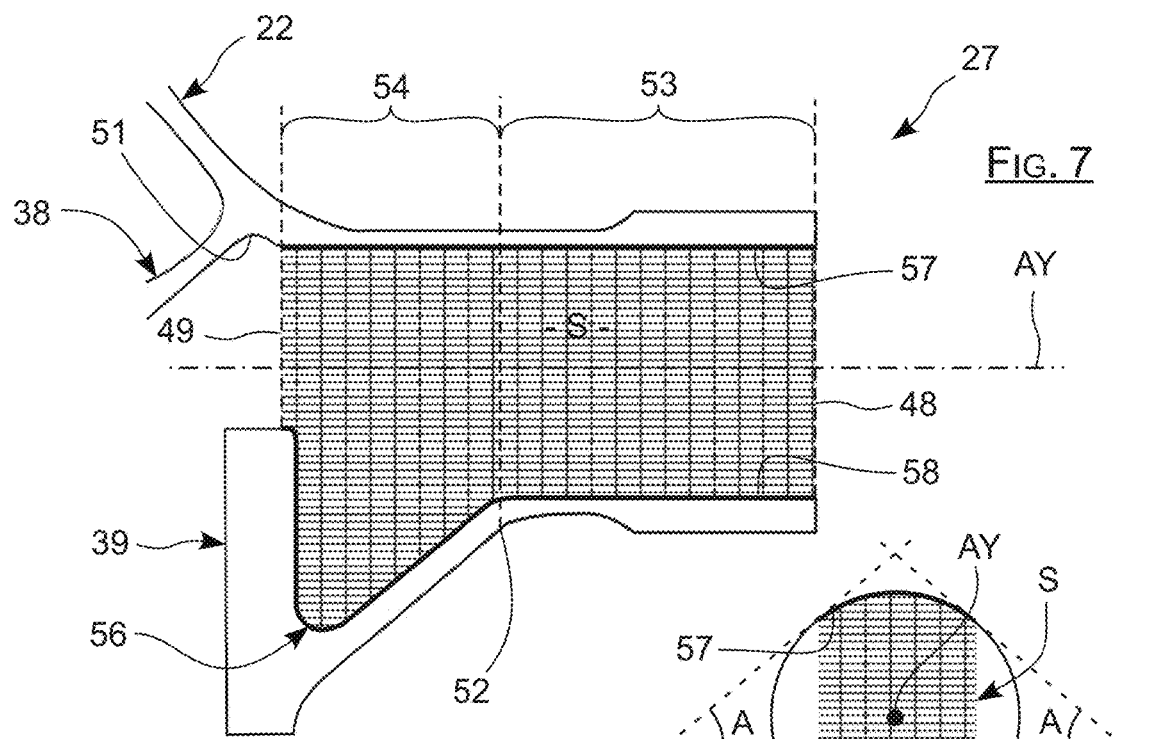
FIG. 7
FIG. 8
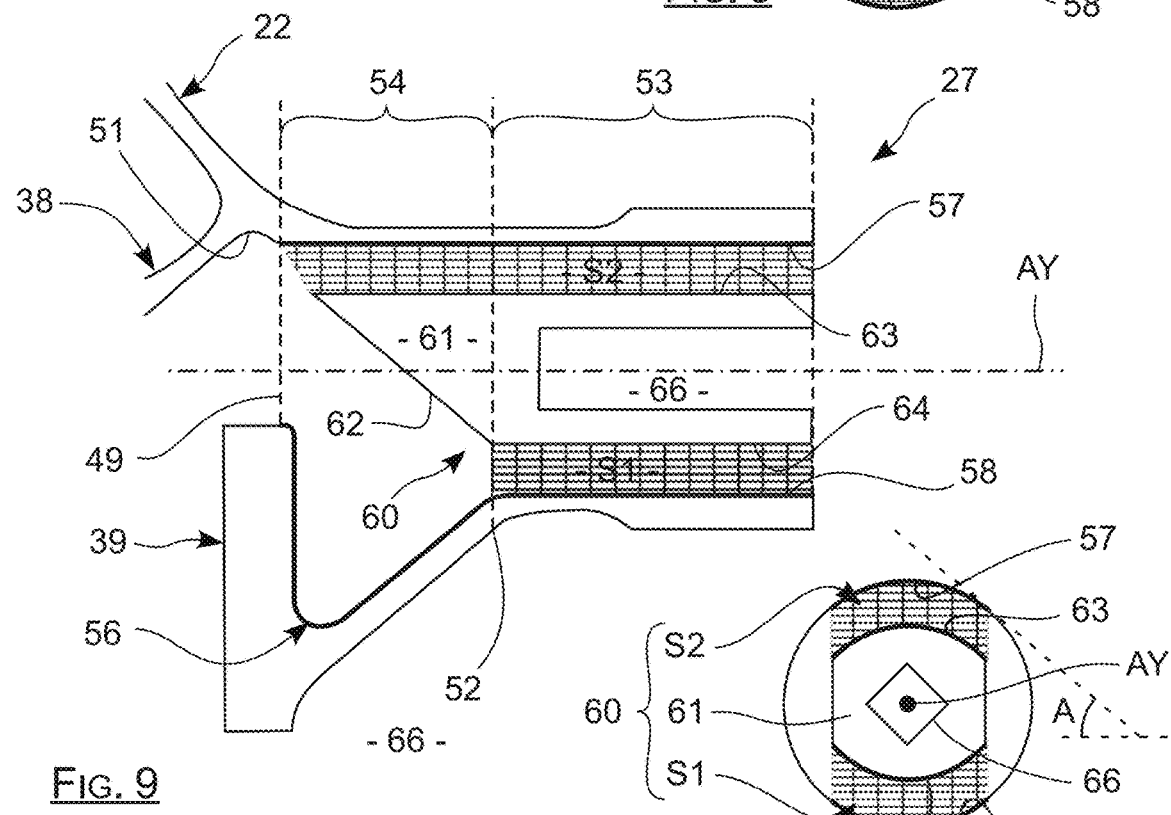
FIG. 9
FIG. 10

METHOD AND APPARATUS FOR OPTIMISATION OF THE SUPPORTS FOR THE ADDITIVE MANUFACTURING OF A COMPONENT WITH A RECESS

This is the National Stage of PCT international application PCT/FR2019/050611, filed on Mar. 19, 2019 entitled "OPTIMISATION OF SUPPORTS FOR THE ADDITIVE MANUFACTURING OF A COMPONENT WITH A RECESS", which claims the priority of French Patent Application No. 1852558 filed Mar. 23, 2018, both of which are incorporated herein by reference in their entirety.

TECHNICAL FIELD

The present invention relates to the forming of a bearing support of an aircraft engine by additive manufacturing.

GENERAL CONTEXT OF THE INVENTION

A bypass turbine engine includes an inlet sleeve receiving the air upstream that is aspirated by a low-pressure compressor, before being divided into a central primary flow and a secondary flow surrounding the primary flow. After having passed the low-pressure compressor, the secondary flow is propelled downstream to generate a thrust by being blown around the primary flow, upstream and downstream being defined with respect to the direction of flow of fluid in the turbine engine.

After having passed the low-pressure compressor, the primary flow passes through a high-pressure compressor before reaching a combustion chamber. This primary flow is then expanded in a high-pressure turbine engine linked in rotation with the high-pressure compressor, then in a low-pressure turbine linked in rotation to the low-pressure compressor, before being expulsed downstream.

In the case of a two-spool turbine engine, the high-pressure compressor and the high-pressure turbine are part of a high-pressure body that surrounds a low-pressure trunnion by rotating at a speed different from the latter, this low-pressure trunnion carrying the low-pressure compressor and the low-pressure turbine.

The low-pressure trunnion and the high-pressure body are carried upstream and downstream by bearings housed in enclosures that isolate them from the rest of the engine. Each bearing is lubricated by oil circulating in the enclosure that surrounds it, and which is delimited by fixed elements and by the rotating element that passes through it. Such a bearing is carried by a support while being surrounded by the enclosure.

FIG. 1, of a section of a downstream portion of a turbine engine 1 according to a design possibility that the invention proposes to improve, shows a low-pressure trunnion 2, at the downstream end of which is made integral a ferrule 3 that extends radially to be made integral with discs 4 of a low-pressure turbine 5 extending around a downstream portion of the trunnion 2.

The trunnion 2 is surrounded in its downstream region by a bearing support 6 that carries a sleeve 7 intended to receive a roller bearing 8 to support the downstream portion of the trunnion 2, and which is integral with a fixed element 9 of the engine located upstream thereof, by a cone 10. This cone 10 widens from its downstream portion where it is integral with the support 6, to its upstream portion where it is integral with the fixed element 9.

The cone 10 is surrounded by a cylindrical element 11 integral with the upstream portion thereof that it extends downstream, to delimit with this cone 10 and with the ferrule 3 a portion of an enclosure 12 that encloses the bearing.

As can be seen in FIG. 2 of a design possibility that the invention proposes to improve, a skirt 13 and two revolution members 14 and 15 extend the central region of the cone 10 respectively upstream and downstream, this skirt and these members having outer diameters of about the inner diameter of the cone 10. An upstream support 16 including a ring through which it is fastened upstream of the skirt 13 carries a segmented radial seal 17 that delimits an enclosure 18 upstream from the bearing 8. The revolution element 14 delimits jointly with the trunnion 2 two concentric enclosures 19 and 20 located downstream from the bearing 8.

In light of the manufacturing and mounting constraints with conventional techniques, these components, namely the support 6, the cone 10, the cylindrical element 11 the skirt 13, the element 14 and the upstream support 16 are fastened to one another according to different methods including in particular TIG welding.

Generally, the design and the manufacture of a bearing support are complex and expensive operations that entail a multitude of processes.

The purpose of the invention is to provide a solution to overcome this disadvantage.

DISCLOSURE OF THE INVENTION

For this purpose, the invention has for object a method for obtaining, by additive manufacturing, a component including at least one recess, including:
  a step of forming a one-piece blank component by additive manufacturing on a build plate, during which:
    at least one recess comprises an upper inner portion that needs to be supported, and a lower inner portion opposite this upper inner portion, and
    a support is formed in said at least one recess, this support including a core provided with a hole and cellular elements including at least one lower module that connects the lower inner portion to the core, and an upper module that connects the core to the upper inner portion;
  a step of detaching the support from the rest of the blank component in order to expose the recess, comprising:
    an engagement of an insertion end of a tool in the blind hole, then
    a rotation of the core by the tool inducing a rupture of the lower and upper modules for the extraction of the core.

With this solution, the volume of the cellular element is reduced, with the core constituting an intermediate platform that prevents the formation of a cellular element passing through the recess from the lower inner portion to the upper inner portion in order to support it.

The invention also relates to a method for obtaining by additive manufacturing a component thus defined, wherein the step of detaching the support includes a finishing step to suppress residues from lower and upper modules remained attached to the recess.

With this arrangement, the machining times and costs associated with the complete removal of the support are reduced.

The invention also relates to a method for obtaining by additive manufacturing a component thus defined, wherein:
  the lower module is erected from all or at least one portion of the lower inner portion, while still forming a bearing surface for the formation of the core from a lower surface of core opposite all or at least one portion of this lower inner portion, and the upper module is erected from all or at least one portion of an upper surface of core opposite the upper inner portion, while still forming a bearing surface for the formation of this upper inner portion.

The invention also relates to a method for obtaining by additive manufacturing a component thus defined, wherein the core has a left morphology, by comprising at least one portion opposite the lower inner portion that does not require being supported during the manufacture of the core.

The invention also relates to a method for obtaining by additive manufacturing a component thus defined, wherein:
the recess is a duct comprising a cylindrical portion and a bulging portion that extends the cylindrical portion; with
the upper inner portion forming a cylinder portion along the cylindrical portion and the bulging portion;
the lower inner portion forming a cylinder portion along the cylindrical portion and following a contour as an arched groove in the bulging portion;
the core including a portion of constant section in the cylindrical portion and a bevelled portion that extends the portion of constant section in the bulging portion by forming a ramp facing the lower inner portion following a contour as an arched groove, this ramp not needing to be supported during the additive manufacturing.

With the arrangement of the support, the method according to the invention makes it possible to manufacture a recess of complex shape, without the lower module being erected from the lower inner portion following a contour as an arched groove, difficult to access for machining.

The invention also relates to a method for obtaining by additive manufacturing a component thus defined, wherein the portion of constant section of the core located in the cylindrical portion is oblong.

The invention also relates to a method for obtaining by additive manufacturing a component thus defined, wherein the transition between the ramp and the portion of constant section of the core is marked by the interface between the cylindrical portion and the bulging portion of the recess.

The invention also relates to a method for obtaining by additive manufacturing a component thus defined, wherein the hole includes a square section of which the sides are oriented at 45° with respect to the build plate.

The invention also relates to a method thus defined, wherein the component is a bearing support.

The invention also relates to an aircraft engine comprising a bearing support manufactured with the method thus defined.

BRIEF DESCRIPTION OF THE DRAWINGS

FIG. 7 is a diagrammatical cross-section view of a duct containing a support formed according to the prior art;

FIG. 8 is a diagrammatical front view of a duct containing a support formed according to the prior art;

FIG. 9 is a cross-section view of a blank component with a duct containing a support according to the invention;

FIG. 10 is a front view of a duct of a blank component, this duct containing a support according to the invention;

DETAILED DISCLOSURE OF PARTICULAR EMBODIMENTS

Bearing Support

According to the invention, the bearing support is a metal component formed from a single piece by additive manufacturing, including in particular a fastening cone and a cylindrical element surrounding this cone, instead of manufacturing them separately to then assemble them.

Figure 1:
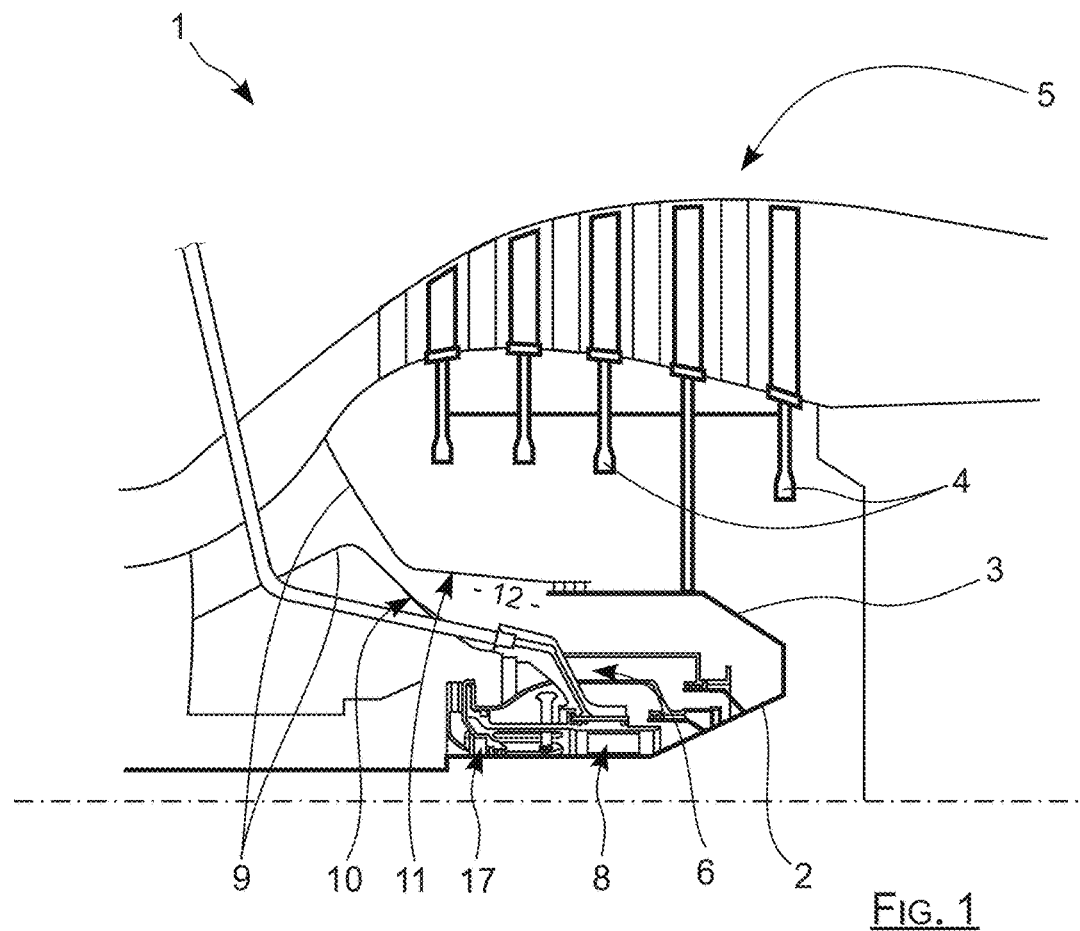
FIG. 1 already described is a diagrammatical cross-section view of a section of a downstream portion of a turbine engine.
Figure 2:
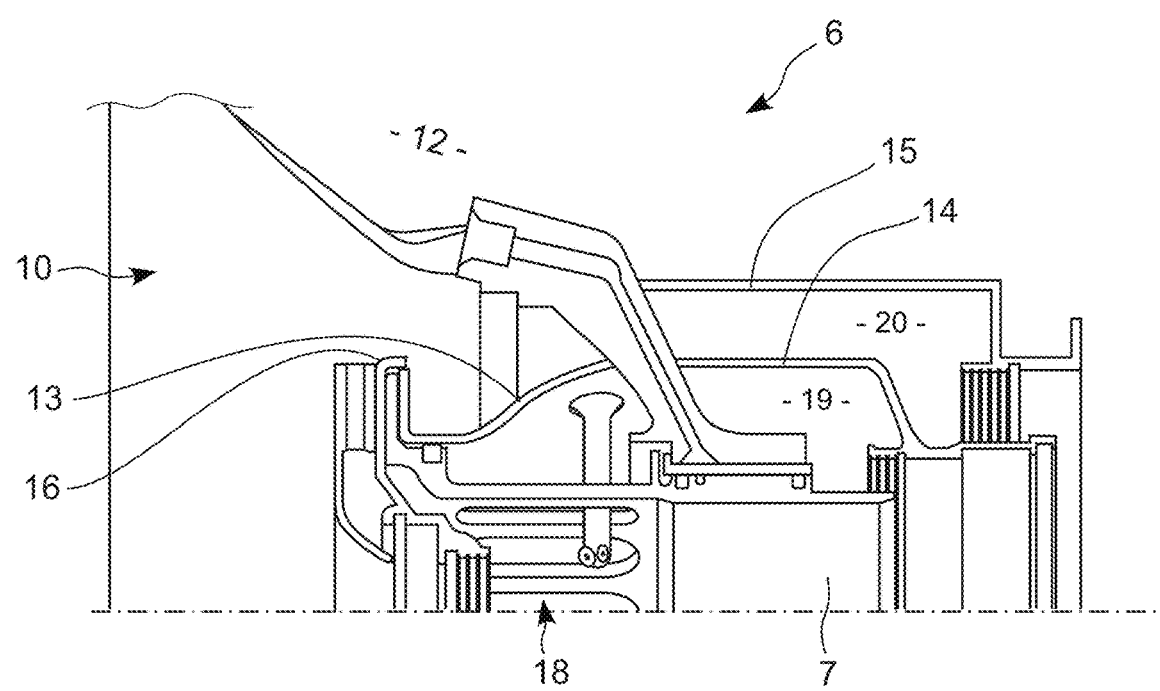
FIG. 2 already described is a cross-section view of a portion of a section of the downstream portion of a turbine engine.
Figures 3, 4:
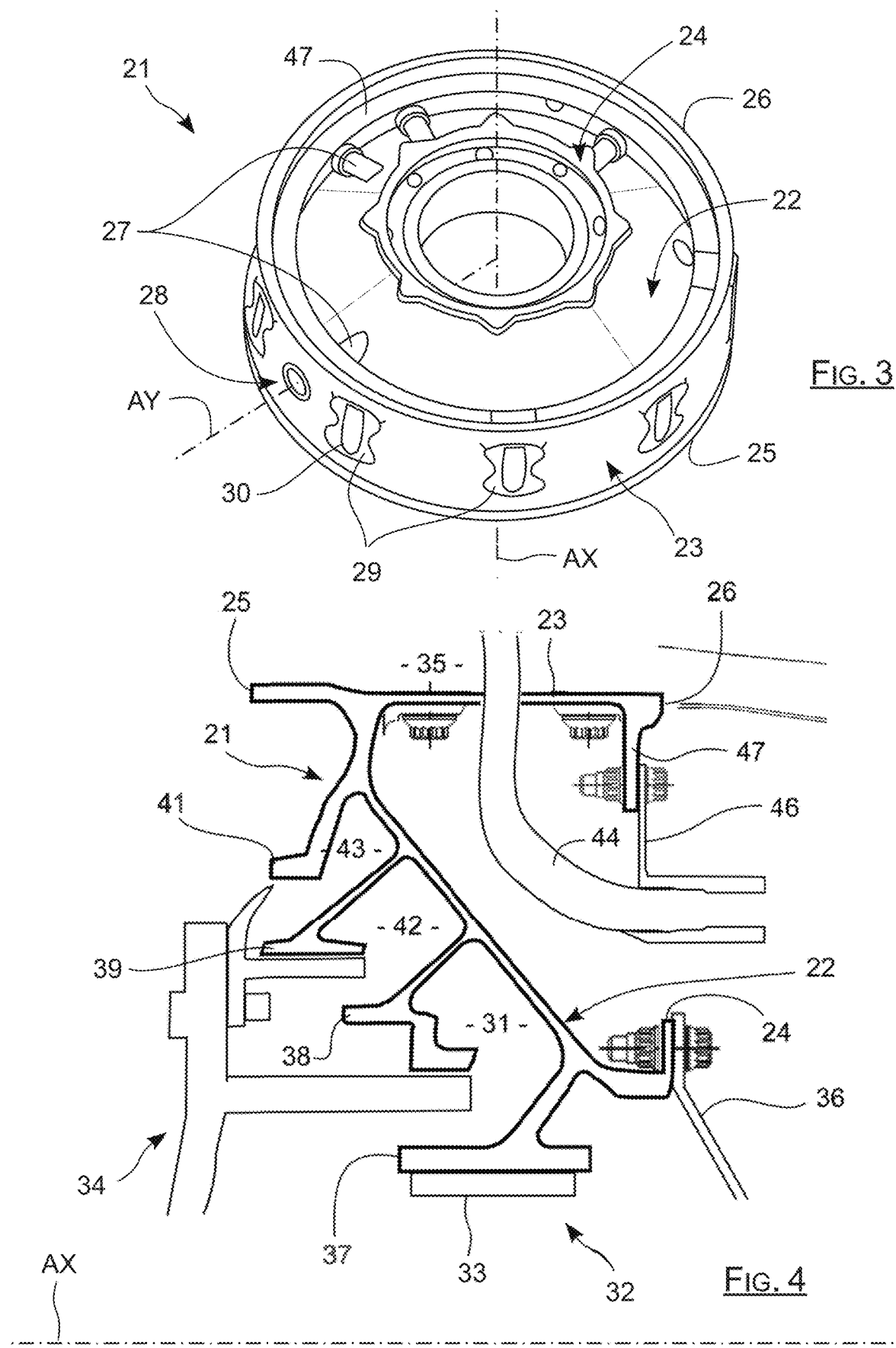
FIG. 3 is a perspective view of a bearing support manufactured according to the invention.
FIG. 4 is a cross-section view of a portion of an aircraft engine provided with a bearing support manufactured according to the invention.

This bearing support that appears in FIG. 3 where it is marked by 21 includes a cone frustum or cone 22, that has its large-diameter periphery extended by a generally cylindrical element 23, and having its small-diameter periphery extended by a ring 24. The bearing support 21 has a general shape of revolution about an axis AX coincident with the longitudinal axis of the engine wherein it is intended to be mounted, the cone 22 and the cylindrical element 23 having this axis AX as axis of revolution.

The cylindrical element 23 extends from a first edge 25 to a circular second edge 26 that substantially has the same diameters while still being spaced from one another along the axis AX. The first edge 25 is the closest to the large-diameter periphery of the cone 22, this cone having a diameter that shrinks when approaching the second edge 26.

The bearing support 21 further includes four ducts 27, wherein oil and/or air circulate, which pass through the cone 22 radially with respect to the axis AX by extending to the vicinity of the cylindrical element 23. An orifice 28 is formed in the cylindrical element opposite each duct 27.

This bearing support also includes bosses 29 that radially extend beyond the cylindrical element 23 outwards by being regular spaced along the circumference thereof. Each boss 29 includes a central window i.e. an opening that places in communication the inside and the outside of the cylindrical element 23.

FIG. 4 shows a portion of an aircraft engine provided with a bearing support of the type of support 21 delimiting a main enclosure 31 that surrounds a bearing 32 that encloses an outer bearing ring 33. This main enclosure 31 is delimited by a trunnion portion 34 of axis AX, by the bearing support 21 of which the cylindrical element 23 is fastened to a fixed element 35 of the engine, and by a ferrule 36, fastened to the ring 24 that extends the bearing support 21 to the axis AX.

A series of rings 37, 38, 39, 41 extends beyond the cone 22 to the axis AX. The first ring 37 protrudes in the main enclosure 31 to carry the ring 33. Each other ring 38, 39 and 41 is contiguous with a corresponding portion of the trunnion 34, to delimit with it two annex annular enclosures 42 and 43.

When the bearing support 21 is integrated into the engine, it is provided with at least one pipe 44 that radially passes through a window 30, and folds back parallel to the axis AX. This pipe 44 is carried by a retaining member 46 fastened to a stiffener 47. This stiffener 47 has a shape of an inner ring, i.e. protruding radially to the axis AX over the entire periphery of the cylindrical element, by being located in the vicinity of the second edge 26. Such a bearing support typically includes two pipes of the type of pipe 44, spaced one from the other by an angle of thirty degrees around the axis AX.

Additive Manufacturing

The additive manufacturing on a bed of powder designates the adding of material layer by layer, on a build plate of a dedicated machine, to form a physical object from a digital model. In the case of a metal component, the laser melting/sintering method is used which consists in totally or partially melting a thin material powder layer using a laser at each pass.

Figure 5:
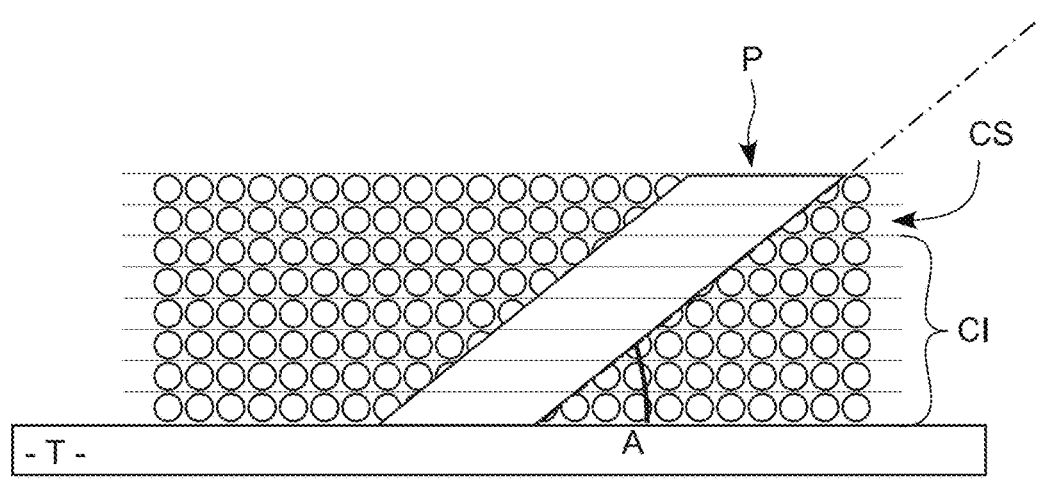
FIG. 5 diagrammatically shows a problem of collapsing during the additive manufacturing of a component.

The powder used for laser melting/sintering is not self-bearing. As can be seen in FIG. 5, during the manufacture of a component P, the powder that is not melted/sintered of the lower layers marked by CI, i.e. that is not swept by the laser, is not able to support the melted powder of a consecutive upper layer CS beyond a minimum clearance angle A between the component P and the build plate T.

To resolve this question, while manufacturing the component, supports are formed that support each region having a clearance angle less than the minimum angle A, in order to prevent a local collapse. The component and the supports are integral, manufactured at the same time and made of the same material.

Once the additive manufacturing is completed, the supports constitute non-functional material and must thus be removed, for example by machining. For this purpose, these supports are fully cellular elements, generally in the form of mesh or coming from the ordered structure stack called lattices, consuming less powder and being more easily removable than a block of uniform material.

During the manufacturing thereof, the bearing support 21 is oriented in such a way that its axis of revolution AX is normal to the build plate T, by starting with the formation of the first edge 25 of the cylindrical element 23. In the example of the figures, the minimum clearance angle A is defined at 40° with respect to the plate T, and certain regions of the bearing support 21 have a clearance angle less than this minimum angle A, and require being supported.

In the rest of the following description, the terms "lower and "upper" are to be considered with respect to the direction of manufacture of the bearing support from the build plate T. An element is said to be upper with respect to another if it is farther away from the build plate T than the other, and an element is said to be lower with respect to another if it is not as far away from the plate T as the other.

Manufacture of the Bearing Support with Supports According to the Prior Art

Figure 6:
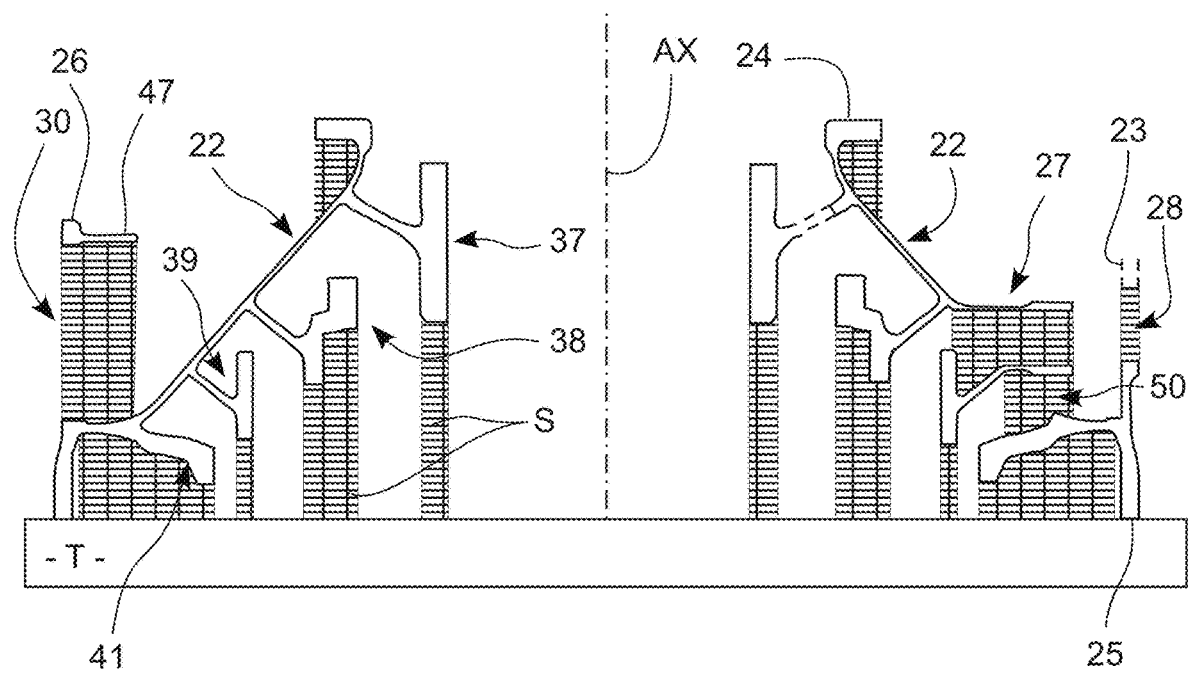
FIG. 6 is a cross-section view of a bearing support with supports formed according to the prior art.

The example of FIG. 6 shows supports S for the manufacture of the bearing support 21 which are fully cellular and arranged according to the prior art, and wherein each ring 37, 38, 39 and 41 requires a support erected from the plate T, since the faces from which the manufacture thereof begins are at a distance from the plate T and parallel to the latter, having in fact a clearance angle of 0°.

Supports S are also necessary for the formation of ducts 27, orifices 28 and windows 30. Moreover, the cone 22 comprises a through-hole 50 formed under ducts 27, which requires locally supporting the ring 39 with a support erected from the ring 41 located below.

Regarding the ring 24 and certain portions of stiffener 47 located at windows 30 by having a radial section that has a shape corresponding to that of the letter Γ, they extend normally to the axis AX. This ring 24 and these portions of stiffener are thus parallel to the plate T, and require being supported by supports erected from the bearing support 21, in particular from the cone 22.

As can be seen in more detail in FIG. 7, each duct 27 extends, in a direction noted as AY, from a first opening 48 located outside the cone 22 to a second opening 49 that opens inside the latter. More particularly, the duct passes through the cone 22 in the vicinity of its junction 51 with the ring 38, and at its junction 52 with the ring 39.

Each duct 27 constitutes a recess with a cylindrical portion 53, extending between the first opening 48 and the junction 52, and a bulging portion 54, that extends this cylindrical portion 53 to the second opening 49. The bulging portion 54, i.e. including a portion with a larger section than the cylindrical portion 53, is delimited in particular by the contour of the ring 39 that forms at this location an arched groove 56.

An upper inner portion of duct 57 that corresponds to a cylinder portion over the entire extent of the duct 27, concave with respect to the plate T, includes tangents that form with the plate Tan angle less than the minimum clearance angle A, as can be seen in FIG. 8. The duct 27 also includes a lower inner portion of duct 58 that is located closer to the plate T and opposite the upper inner portion of duct 57. This lower inner portion of duct 58 corresponds to a cylinder portion in the cylindrical portion 53, while it follows the contour of the arched groove 56 in the bulging portion 54.

As can be seen in FIGS. 7 and 8, the upper inner portion of duct 57 must necessarily rest on a support S erected from the lower inner portion of duct 58, including the arched groove 56.

As the removal of such a support S, which is fully cellular and formed in the arched groove 56, is difficult in light of the size, the idea at the base of the invention is to propose an alternative solution to this support S known in FIGS. 7 and 8 for the support of the upper inner portion of duct 57.

Manufacture of the Bearing Support in Accordance with the Method According to the Invention In reference to FIGS. 9 and 10, the method according to the invention provides to obtain a blank component, in other words the bearing support 21 in a state at the laser melting/sintering machine output, wherein each duct 27 is provided with a support 60. This support 60 comprises a core 61 in the form of a block of material, and lower and upper modules marked respectively by S1 and S2 which are cellular elements that connect the core 61 to the duct 27.

This core 61 includes an oblong portion of constant section that extends along the axis AY along the cylindrical portion 53, as can be seen in particular in FIG. 10. This oblong portion is extended by a bevelled portion in the bulging portion 54, by forming a ramp 62 with a clearance angle of 40° with the plate T, i.e. facing the lower inner portion of duct 58. Thus, the core 61 does not require being supported during the additive manufacturing at the ramp 62 in such a way as to overcome a delicate machining step of the cellular element nested within the arched groove 56.

An upper surface of core 63 is distinguished opposite and at a distance from the upper inner portion of duct 57, and a lower surface of core 64 is distinguished opposite and at a distance from the lower inner portion of duct 58 at the cylindrical portion 53, as the ramp 62 extends the lower surface of core 64 in the bulging portion 54. The lower module S1 connects the lower inner portion of duct 58, which is located only in the cylindrical portion 53, to the lower surface of core 64. The upper module S2 connects the upper surface of core 63 to the upper inner portion of duct 57, the lower and upper modules S1 and S2 being separated from one another.

During the manufacture, the supports 60 are constructed at the same time as the bearing support 21. The lower module S1 is erected along AX from the lower inner portion of duct 58 to manufacture the core 61, then the upper module S2 is erected along AX from the upper surface of core 63 to support the upper inner portion of duct 57. In other words, the core 61 constitutes an intermediate platform that prevents the formation of cellular support in the arched groove 56.

Figure 11:
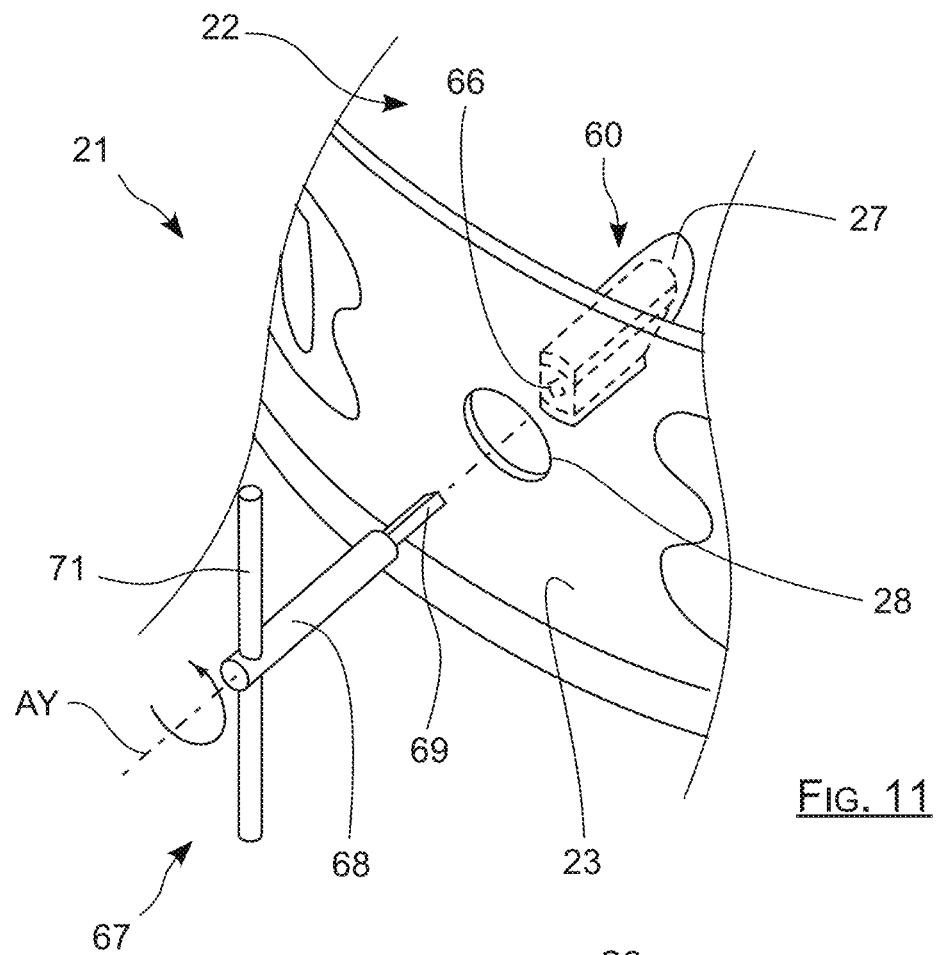
FIG. 11 is a partial view of a blank component and of a tool for removing a support according to the invention.

A blind hole 66 is formed in the core 61 to facilitate the extraction thereof outside the duct 27 from the outside of the cone 22 with a tool marked with 67 in FIG. 11. This hole 66 extends parallel to the plate T along the direction AY, and opens at the first opening 48 of the duct 27, located outside the cone 22, and has a square section of which the sides are oriented at 45° with respect to the plate T in order to overcome additional supports. In this respect, the invention advantageously provides that the hole 66 extends along a major portion of the core 61, increasing the quantity of non-melted powder which is housed in this hole 66 during the manufacture and which is able to be reused later. As shown in FIG. 11, the tool 67 includes a rod 68 that has an insertion end 69 with a square section that is inserted into the hole 66, and an a grasping end passed through by a handle 71 extending perpendicularly to this rod 68.

The detaching of the support 60 from the rest of the manufacturing blank, carried out by an operator, consists first of all in removing the cellular supports S manufactured to support the orifices 28, by local machining, in order to expose the access to the blind hole 66. The operator aligns the rod 68 of the tool 67 in the direction AY of the duct 27, then inserts the insertion end 69 into the hole 66 by passing through the cylindrical element 23, then exerts a rotation movement of the tool around the rod 68 thanks to the handle 71, forming a lever arm, to extract the core 61. The rotation of the core 61 around the direction AY has for effect to break the lower and upper modules S1 and S2 by shearing and thus expose the core 61, with the torsional moment resulting from the rotation of the core being directed along AY, namely perpendicularly to the direction of extent along AX of the lower and upper modules S1 and S2. Finally a belting, in other words an abrasion, is carried out to remove any residues from lower and upper modules S1 and S2 which remained attached at the upper and lower inner portions of duct 57 and 58.

The arrangement of the support 60 allows for the manufacture of the duct 27 with complex geometry by being only attached to this duct at only the regions forming a cylinder portion, thus reducing the time, the difficulty and the costs of machining.

The invention is not limited to the described embodiment of the core 61, and allows for the use of various shapes when the extraction thereof is possible and that it ensures its platform function preventing the formation of support in a zone for which machining is difficult to carry out.

Furthermore the core 61 can have a specific shape that influences the fracture surfaces of the lower and upper modules S1 and S2 so that they break preferably at the interface thereof with the duct 27 while still remaining attached to the core, decreasing and even suppressing the belting time. For example, the core can be provided with teeth that extend beyond the upper and lower surfaces of core 63 and 64 by extending to the close vicinity of the upper and lower inner portions of duct 57 and 58 respectively.

The hole 66 can be formed blind as described, or be a through-hole. It is also possible to provide one or more holes 66 of the slot, triangular, hexagonal or other type according to the tool that is desired to be used, as the invention is not limited in that the core imparts a rotation movement to break the lower and upper modules S1 and S2.

Using a hook can also be considered to extract this core 61 outside of the duct 27, or even impart repeated impacts on the latter until breakage of the lower and upper modules S1 and S2.

Concretely, the method according to the invention has an application in the general field of additive manufacturing, by proposing an alternative to the cellular support S of the prior art which conducts simpler extraction, to support at least one inner portion of a recess formed in a component.

In the example of the figures, the duct 27 constitutes a recess that extends parallel to the plate T. But the method according to the invention can be applied whatever the morphology and the orientation of the recess when there is at least one inner portion of which the tangents each form with the plate T an angle less than the minimum clearance angle A. The geometry of the core can thus be defined according to the morphology of this recess which is not limited to the forms described hereinabove. It is however to be noted that the value of this minimum clearance angle A is not necessarily equal to 40°, as it depends on the additive manufacturing machine on a powder bed used as well as the nature of the powder. In this respect, the invention could provide that the ramp 62 form an angle with the plate T of a different value in order to respect a new value of the minimum clearance angle A.

In the example of the figures, the ramp 62 of the core 61 is formed opposite the arched groove 56 in order to prevent the formation of the lower module S1 within the latter, but it is to be noted that the core can have another ramp location in response to another recess morphology. Furthermore, in addition to the interest of simplifying post-manufacture machining, it is to be noted that the existence of such a ramp 62 allows for reduced consumption of metal material powder, as in this location the core 61 does not require being supported by the lower inner portion 58 via a cellular element. In this respect, the invention could provide to form a core 61 having free form surfaces, with a portion opposite the lower inner portion 58 that does not require being supported during the manufacture of this core 61 for the purpose solely of saving material, by retaining for example the ramp 62 in the absence of an arched groove 56. In other words this portion of core, which does not require being supported during manufacture, can be formed without the exclusive need of preventing the formation of the lower module S1 in a zone of singularity that is difficult to access for machining, and this regardless of the morphology of the recess.

Figure 12:
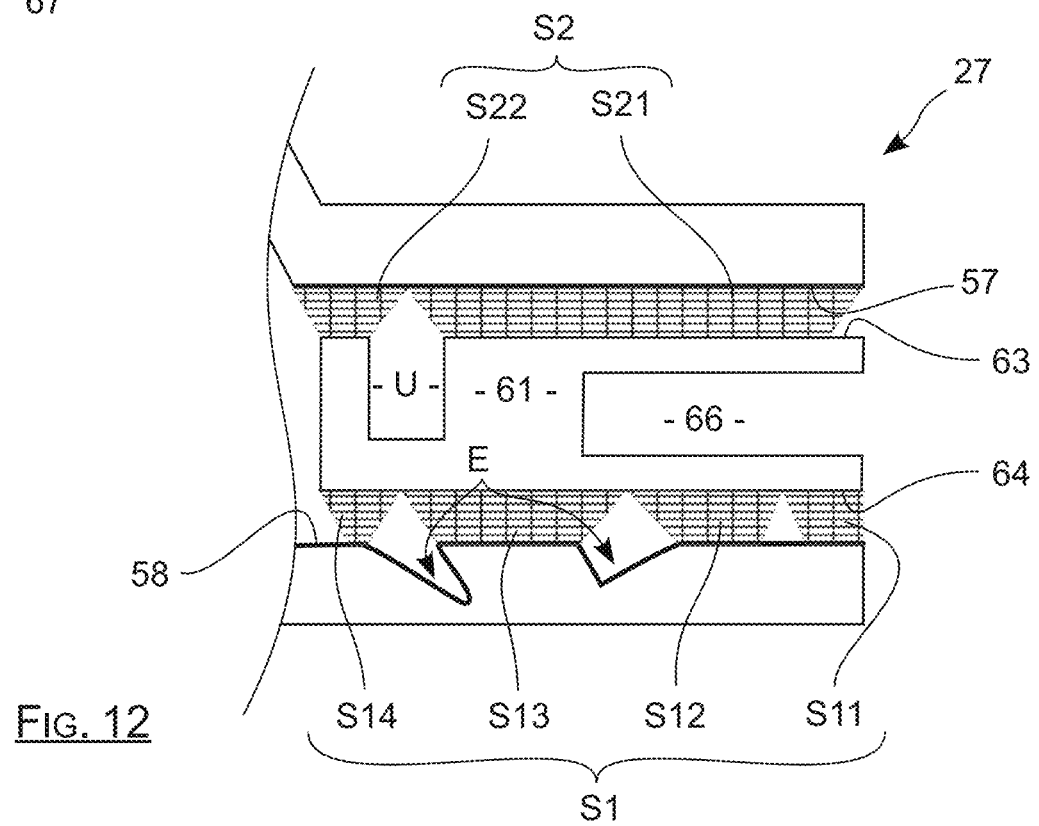
FIG. 12 is a cross-section view of a blank component with a duct containing a support alternative according to the invention.

Following the same reasoning, in order to further limit the powder used and/or prevent the implantation of support at zones of singularities of a lower inner portion of recess, which are difficult to access for machining, the invention could provide that the lower module S1 be formed from different cellular fragments marked on FIG. 12 with S11, S12, S13 and S14 in a non-limiting manner. These cellular fragments, in particular of prismatic shape, are each erected from zones that are on the contrary free of singularity, these singularities being marked here with E. With the successive layers of powder, these fragments widen by respecting the minimum clearance angle A to come together and form a support surface without discontinuity for the manufacture of all or a portion of the lower surface of the core 64 that needs to be supported. In other words, a lower module S1 that is erected locally at different locations of the lower inner portion 58 does not lie outside the scope of the invention. It is understood here that such cellular fragment can be formed so as to save material only, in other words without it being necessary to avoid a zone that is difficult to access for machining, such as can be seen in FIG. 12 between the fragment S11 and S12.

This arrangement also applies to the upper module S2 which can be erected locally from different locations of the upper surface of core 63 in the form of fragments S21 and S22 in a non-limiting manner, while still forming a bearing surface without discontinuity for the satisfactory formation of all or a portion of the upper inner portion 57 that needs to be supported.

Finally, as can be seen in particular in FIG. 12 and in a non-limiting manner, the invention could provide to further limit the powder used by forming the core with a cavity between two fragments here marked with U between the fragments S21 and S22. Such a cavity can also be provided in the core between two fragments of the lower module S1 with the condition that this cavity does not require being supported. Such a cavity, formed in the core opposite the lower inner portion 58, can for example be formed from the juncture of two ramps extending with an angle greater than the angle A to form a triangular contour, or can have a broken arch contour, also called an ogive head contour, according to a cross-section view of the recess.

What is claimed is:

1. A method for obtaining, by additive manufacturing, a one-piece blank component including at least one recess (27), including:
   a step of forming the one-piece blank component by additive manufacturing on a build plate (T), during which:
   at least one recess comprises an upper inner portion (57) that needs to be supported, and a lower inner portion (58) opposite the upper inner portion (57), and
   a support (60) is formed in said at least one recess, the support including a core (61) provided with a hole (66) and cellular elements (S1; S2) including at least one lower module (S1) that connects the lower inner portion (58) to the core (61), and an upper module (S2) that connects the core (61) to the upper inner portion (57);
   a step of detaching the support (60) from the blank component in order to expose the recess (27), comprising:
   an engagement of an insertion end (69) of a tool (67) in the hole (66), then
   a rotation of the core (61) by the tool (67) inducing a rupture of the lower and upper modules (S1, S2) for the extraction of the core (61).

2. The method according to claim 1, wherein the step of detaching the support (60) includes a finishing step to suppress residues from lower and upper modules (S1, S2) remained attached to the recess (27).

3. The method according to claim 1, wherein:
   the lower module (S1) is erected from all or at least one portion of the lower inner portion (58), while forming a bearing surface for the formation of the core from a lower surface of core (64) opposite all or at least one portion of this lower inner portion (58), and
   the upper module (S2) is erected from all or at least one portion of an upper surface of core (63) opposite the upper inner portion (57), while forming a bearing surface for the formation of this upper inner portion (57).

4. The method according to claim 1, wherein the core (61) has free form surfaces, while comprising at least one portion opposite the lower inner portion (58) that does not require being supported during the manufacture of the core (61).

5. The method according to claim 4, wherein:
   the recess is a duct comprising a cylindrical portion (53) and a bulging portion (54) that extends the cylindrical portion (53); with
   the upper inner portion (57) forming a cylinder portion along the cylindrical portion (53) and the bulging portion (54);
   the lower inner portion (58) forming a cylinder portion along the cylindrical portion (53) and following a contour as an arched groove (56) in the bulging portion (54);
   the core including a portion of constant section in the cylindrical portion (53) and a bevelled portion that extends the portion of constant section in the bulging portion (54) by forming a ramp (62) facing the lower inner portion (58) following a contour as an arched groove, this ramp not needing to be supported during the additive manufacturing.

6. The method according to claim 5, wherein the portion of constant section of the core (61) located in the cylindrical portion (53) is oblong.

7. The method according to claim 5, wherein the transition between the ramp (62) and the portion of constant section of the core is marked by the interface between the cylindrical portion (53) and the bulging portion (54) of the recess.

8. The method according to claim 1, wherein the hole (66) includes a square section of which the sides are oriented at 45° with respect to the build plate (T).

9. The method according to claim 1, wherein the component is a bearing support (21).

10. An aircraft engine comprising a bearing support (21) manufactured with the method according to claim 9.

\* \* \* \* \*